US011604245B2

(12) United States Patent
Günzel et al.

(10) Patent No.: US 11,604,245 B2
(45) Date of Patent: Mar. 14, 2023

(54) METHOD FOR ESTABLISHING THE PRESENCE OF A MISALIGNMENT OF AT LEAST ONE SENSOR WITHIN A SENSOR GROUP (71) Applicant: Volkswagen Aktiengesellschaft, Wolfsburg (DE)

(72) Inventors: Thorben Günzel, Braunschweig (DE); Philipp Hüger, Rühen (DE); Jana Seeland, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 647 days.

(21) Appl. No.: 16/708,938

(22) Filed: Dec. 10, 2019

(65) Prior Publication Data
US 2020/0182957 A1 Jun. 11, 2020

(30) Foreign Application Priority Data
Dec. 11, 2018 (DE) ...................... 10 2018 221 427.1

(51) Int. Cl.
*G01S 3/02* (2006.01)
*G01S 3/782* (2006.01)
(Continued)

(52) U.S. Cl.
CPC .............. *G01S 3/023* (2013.01); *G01S 3/782* (2013.01); *G01S 3/801* (2013.01); *G01S 3/805* (2013.01); *G01S 13/867* (2013.01); *G01S 13/931* (2013.01)

(58) Field of Classification Search
CPC ........ H04N 13/246; G06T 7/85; G06V 20/56; B60R 2300/105; B60R 1/00; G01S 17/894; G01S 7/497; G01S 3/023; G01S 3/782; G01S 3/801; G01S 3/805; G01S 13/867; G01S 13/931; G01S 7/4972;
(Continued)

(56) References Cited

U.S. PATENT DOCUMENTS 8,527,141 B2 * 9/2013 Takahashi ............. G01S 17/931
701/487
10,137,904 B2 11/2018 Chundrlik, Jr. et al.
(Continued)

FOREIGN PATENT DOCUMENTS

DE 102013206707 A1 10/2014 ............ B60W 50/04
DE 102015005961 A1 2/2016 ............... G01D 1/02
(Continued)

OTHER PUBLICATIONS

German Office Action, Application No. 102018221427.1, 5 pages, dated Aug. 21, 2019.
(Continued)

*Primary Examiner* — Olumide Ajibade Akonai
(74) *Attorney, Agent, or Firm* — Slayden Grubert Beard PLLC (57) ABSTRACT The invention relates to a method for establishing the presence of a misalignment of at least one sensor within a sensor group with two or more sensors which detects objects in the surroundings of a motor vehicle, wherein at least two of the sensors differ from each other in their measuring principle and the measurement signals from the sensors are compared with each other.

16 Claims, 3 Drawing Sheets (51) Int. Cl.
*G01S 3/801* (2006.01)
*G01S 3/805* (2006.01)
*G01S 13/86* (2006.01)
*G01S 13/931* (2020.01)

(58) Field of Classification Search
CPC .. G01S 7/4026; G01S 7/52004; G01S 13/862; G01S 13/865; G01S 13/87; G01S 15/86; G01S 15/87; G01S 15/931; G01S 17/86; G01S 17/89; G01S 17/931; G01S 2013/93271; G01S 7/4034; G01S 7/403; G01S 13/89; G02B 7/003; B60W 50/045; B60W 50/04; B60W 2050/0215; B60W 2420/52

See application file for complete search history.

(56) References Cited

U.S. PATENT DOCUMENTS

| | | | |
|---|---|---|---|
| 10,346,715 B2* | 7/2019 | Makarewicz | G06T 7/80 |
| 10,916,035 B1* | 2/2021 | Kroeger | G06T 7/80 |
| 11,555,903 B1* | 1/2023 | Kroeger | G05D 1/0274 |
| 2005/0062615 A1 | 3/2005 | Braeuchle et al. | 340/903 |
| 2013/0218398 A1* | 8/2013 | Gandhi | G01S 13/931 |
| | | | 701/31.1 |
| 2015/0049193 A1* | 2/2015 | Gupta | G03B 43/00 |
| | | | 348/148 |
| 2016/0205395 A1* | 7/2016 | Schmidt | G06K 9/6262 |
| | | | 348/148 |
| 2016/0349356 A1* | 12/2016 | Takaki | G01S 13/931 |
| 2019/0011927 A1* | 1/2019 | Mou | G06V 20/56 |
| 2020/0116854 A1* | 4/2020 | Jeon | G01S 7/4026 |
| 2020/0193643 A1* | 6/2020 | Hess | G01S 5/0284 |
| 2020/0355810 A1* | 11/2020 | Meng | H04L 67/12 |

FOREIGN PATENT DOCUMENTS

| | | | | |
|---|---|---|---|---|
| DE | 102015001971 A1 | 8/2016 | ............ | B60W 50/02 |
| DE | 102015016888 A1 | 10/2016 | ............ | B60W 50/04 |
| DE | 102015206605 A1 | 10/2016 | ............ | B60R 16/02 |
| DE | 102015217771 A1 | 3/2017 | ............ | B60R 16/02 |
| DE | 102017005671 A1 | 12/2017 | ............ | B60R 16/02 |
| JP | 5976027 B2 | 8/2016 | ............ | G01S 13/86 |

OTHER PUBLICATIONS

Extended European Search Report, Application No. 19209214.6, 12 pages, dated Mar. 13, 2020.

* cited by examiner

METHOD FOR ESTABLISHING THE PRESENCE OF A MISALIGNMENT OF AT LEAST ONE SENSOR WITHIN A SENSOR GROUP

CROSS-REFERENCE TO RELATED APPLICATIONS

This application claims priority to German Patent Application No. DE 10 2018 221 427.1, filed on Dec. 11, 2018 with the German Patent and Trademark Office. The contents of the aforesaid Patent Application are incorporated herein for all purposes.

TECHNICAL FIELD

The invention relates to a method for establishing the presence of a misalignment of at least one sensor within a sensor group. The invention also relates to a motor vehicle for performing the method.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Nearly every motor vehicle today uses sensors to detect the surroundings in order to be able to provide driver assistance systems with the necessary data. The higher the degree of automation of a motor vehicle is, the more sensors with various measuring principles are used for reasons of redundancy. Interventions in steering and braking of the motor vehicle are also performed here, sometimes depending on the sensor data.

For example, the use of ultrasound sensors for distance measurement is already very widely used today, including in manually steered motor vehicles. Usually, multiple ultrasound sensors are mounted both in the front bumper covering and in the rear bumper covering of the motor vehicle. Ultrasound sensors are also installed in the front lateral and the rear lateral covering areas. The distance measurement serves primarily as parking assistance when parking in parking spaces or also when maneuvering the motor vehicle to generate collision warnings for the driver when distances become too narrow.

As mentioned, sensors with different measuring principles are usually used for surroundings detection in partially automated or even fully automated motor vehicles, wherein the sensors also differ from each other in the size of their detection area, in the size of their detection angle and their position and orientation in the vehicle. Thus, ultrasound sensors based on ultrasound waves are used for detecting objects at close range. Radar sensors (radar=radio detection and ranging) based on radio waves can serve to detect objects at close range (short-range radar) or also to detect objects at long range (long-range radar). Lidar sensors (lidar=light detection and ranging) are also used and are based on electromagnetic waves in the infrared wave length range. Furthermore, the use of image sensors (video cameras) is known, with which a detection of objects is possible both at close and at long range.

Each of the types of sensors mentioned above has disadvantages and advantages due to the physical measuring principles on which they are based, wherein the different types of sensors can complement each other. It is self-evident that faultless functioning of all sensors of a motor vehicle must be ensured so that driver assistance systems dependent on them work correctly and the driver can rely on a safe drive.

A possible source of error of the sensors detecting the surroundings of a motor vehicle is their misalignment. This can be triggered by various causes, for example:
 By the sensor holder including the sensor falling off due to insufficient adhesion or due to damage
 By the sensor falling out of the sensor holder
 By external forces affecting a sensor, for example through deformation of a bumper as a result of an impact during parking
 By manufacturing tolerances A misalignment of the sensor can lead to a significant reduction in its usable range, unusable distances (e.g. to the roadway) or object positions being output or objects in the vehicle surroundings being falsely detected or not detected at all.

A method for monitoring the measurement signals of at least one sensor from a sensor group with at least two sensors is known from the preamble of claim 1 of DE 10 2015 005 961 A1. The sensors have an at least partially overlapping measuring space and detect the same object using different physical measuring principles. A cross-comparison of the measurement signals of the individual sensors of the sensor group is carried out. The average values of the deviations of the measurement signals from each other are detected. In the event of a continuous deviation of the average values from the value zero, a relative decalibration of one of the sensors is determined.

A method and a monitoring device for monitoring of driver assistance systems is described in DE 10 2015 001 971 A1. Depending on surroundings parameters detected by sensors, vehicle guidance commands for a longitudinal or lateral guidance of the motor vehicle are output by the driver assistance system. The plausibility of the vehicle guidance commands is monitored here by comparing with predetermined, plausible threshold values and adjusted if necessary. Further, a functional check of the vehicle components involved in the determination of the vehicle guidance commands takes place. Under certain circumstances, a deactivation of a defective vehicle component takes place.

DE 10 2015 016 888 A1 describes an error recognition method for an environment-detecting sensor apparatus of a motor vehicle suitable for autonomous driving. In the method, a section of a route in front of the motor vehicle is monitored by evaluating established offset data from the sensor apparatus. A position-oriented actual driving path within the already-traveled section of the route is determined by sequentially established position data. A position-oriented target driving path is established by sequentially determined position data. By comparing the position data of the actual driving path with the position data of the target driving path within the already-traveled section of the route, it is calculated whether a deviation in the average is present. An error output takes place if a threshold value is exceeded. A change from manual to autonomous driving is only possible if the established deviation is below the threshold value.

DE 10 2015 217 771 A1 discloses a method for monitoring a sensor function for a motor vehicle. Using a sensor apparatus, a parameter for evaluating a motor vehicle surroundings is detected and a minimum degree of verification is established using a monitoring apparatus. On the basis of the established minimum degree of verification, the detected parameter is evaluated and based thereon the sensor function of the sensor apparatus is then checked.

Finally, DE 10 2017 005 671 A1 describes another method for determining erroneous detections of a sensor system of a motor vehicle. First, a traffic participant in the surroundings of the motor vehicle that is different from the motor vehicle is observed. Then, an area of the surroundings driven by the traffic participant is selected. If an object is now detected by the vehicle's own sensor system in the area driven shortly before by the traffic participant, it is determined that it can only be an erroneous detection.

SUMMARY

An object exists to provide a method which allows the misalignment of a sensor, with which objects in the surroundings of the motor vehicle are to be detected, to be reliably established. Another object exists to propose a suitable motor vehicle to perform the method.

These objects are achieved by a method for establishing a present misalignment with the features of the independent method claim as well as by a motor vehicle with the features of the independent apparatus claim. Various embodiments of the invention are the discussed in the dependent claims and the following description.

The details of one or more embodiments are set forth in the accompanying drawings and the description below. Other features will be apparent from the description, drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In one aspect, a method for establishing a present misalignment of at least one sensor within a sensor group with two or more sensors is provided. The sensor detects objects in the surroundings of a motor vehicle, wherein at least two of the sensors differ from each other in their physical measuring principle. However, the at least two sensors do not necessarily have to have an overlapping detection area. The measurement signals from the sensors are compared with each other. A sensor group can comprise here all or only a partial amount of the sensors installed on the vehicle. For example, it is conceivable to logically form one sensor group each from the sensors located on the front of the vehicle, on the rear of the vehicle and on the sides of the vehicle, respectively. It is also conceivable to logically assign all sensors to one sensor group.

According to the present aspect, it is proposed to conduct the following method steps:

Collecting the objects detected by the sensors in a surroundings map representing the surroundings of the motor vehicle. In other words, each object detected by the sensors is added to a surroundings map representing a surroundings of the motor vehicle. The term "surroundings map" is understood here to mean a stored data pool of the data of all detected objects relative to the vehicle which thus models the surroundings of the motor vehicle. Detection-relevant properties are detected for each object and saved in the surroundings map.

Identifying objects from at least one partial amount of the objects in the surroundings map that were detected within a detection period by one sensor from the sensor group but not by another sensor from the sensor group. A detection period may comprise a plurality of measuring points in time.

Checking whether a detection of the object by the other sensor was possible on the basis of detection-relevant properties of the object. The detection-relevant properties may be given, for example, by height, width, orientation, color, etc. of an object. In other words, it is checked whether information about specific detection-relevant properties of the object that are currently of interest to the other sensor due to its measuring principle are potentially missing. For example, it is conceivable that information about the height of the object is present but information about its color is missing.

If the result of the check is positive, it is checked whether the non-detected object was located in the detection area of the other sensor at the measuring point in time. If so, a misalignment of the other sensor is determined.

Using the procedure described above, a misalignment of a sensor can be very plausibly deduced or determined. In particular and in some embodiments, the method enables a check for misalignment even with sensors of a sensor group that do not have an overlapping detection or measurement area. The method may also be used for only a partial amount of all objects in the surroundings map.

According to some embodiments, a misalignment of the other sensor is only determined if a probability value for the presence of a misalignment of the other sensor reaches or exceeds a threshold value. This can prevent a misalignment of the other sensor from being determined too early. This will be explained in more detail in the following.

The checks described above conveniently take into account characteristic data of the other sensor or characteristic data of the sensors. Characteristic data may be given, for example, by the measuring principle, the range, the opening angle, the position and orientation on the vehicle.

According to some embodiments, it is proposed that the surroundings map representing the surroundings of the motor vehicle is formed in that, for each detected object, its locational relationship relative to the motor vehicle is referenced to a point in time of its detection (measuring point in time) and its detection-relevant properties are detected and saved.

This enables a very exact modeling of the surroundings of the motor vehicle. This contributes to a particularly large amount of information for evaluating a misalignment of a sensor being available and therefore the evaluation being even more exact. The detection-relevant properties may be given, for example and not exclusively, by the height of an object, its width, orientation and also its relative speed (for moving objects) in relation to the motor vehicle.

In addition, each object is assigned to which sensor on the vehicle detected it.

In the embodiments mentioned in the preceding, a movement of the motor vehicle is also taken into account and modeled in the surroundings map representing the surroundings of the motor vehicle. The movement of the motor vehicle between various measuring points in time may be determined, for example, using the vehicle odometry or by means of other suitable methods. The position and/or orientation and/or the relative speed of the motor vehicle in relation to detected objects can also differ from each other at different measuring points in time. This development contributes to a very exact and realistic modeling of the vehicle surroundings in the surroundings map. The time-dependent position and/or speed and/or orientation data may also be stored in the surroundings map as detection-relevant properties of the objects.

In some embodiments, it is proposed that a classification of each detected object with regard to its detection-relevant properties (e.g. height, width, orientation, etc.) is performed and it is checked whether, for the non-detected object, all information for the assessment of a possible detectability by the other sensor that is relevant for the other sensor is available. In other words, it is checked whether information about specific detection-relevant properties of the object that are currently of interest to the other sensor due to its measuring principle are potentially missing. For example, it is conceivable that information about the height of the object is present but information about its color is missing.

In some embodiments, it is proposed that, if a detection of the object by the other sensor is not possible on the basis of the detection-relevant properties of the object, all detection-relevant properties for the measuring principle of the other sensor are available and the non-detected object was located in the detection area of the other sensor at the measuring point in time, a probability for the misalignment of the other sensor is increased. A misalignment is therefore not immediately confirmed or denied as a result of the check. In this manner, it can once again be prevented that a misalignment is unjustifiably recognized.

In such embodiments, the probability value for the misalignment of the other sensor, starting from zero, may be increased incrementally per measurement over multiple measurements up to an upper threshold value. The probability value may then reveal the probability with which a misalignment of the sensor is really present. Such a probability rises with repeated erroneous measurements. Therefore, when the upper threshold value is reached or exceeded and the result of the check of whether the non-detected object lies in the detection area of the other sensor and must have been detectable by it (or its measuring principle) is positive, a misalignment of the other sensor is determined.

However, it must be noted that the probability value for the presence of a misalignment may, for example, also be incrementally lowered again. This may be performed, for example, if another measurement of the sensor has confirmed its faultless functioning at the measuring point in time.

In some embodiments, it is proposed that, when not all relevant information for assessing a detectability by the other sensor is present, it is also checked whether the non-detected object lay in the detection area of the other sensor at the measuring point in time and must have been detectable by the other sensor. To do so, a detection uncertainty resulting from the incomplete information is additionally taken into account when establishing the probability of a misalignment of the other sensor mentioned earlier. This may take place, for example, in that the value of the incremental increase is chosen to be much lower than when all relevant information for assessing a detectability by the other sensor is present.

If, according to some embodiments, it is additionally checked in an availability check whether the other sensor is defective (self-check), blocked (e.g. iced over) and/or subjected to an external source of interference at the point in time at which the object was located in its detection area, frequently occurring reasons for at least temporarily suspended functioning of a sensor can be caught.

In some embodiments, when a misalignment of the other sensor is determined, it is proposed to limit or deactivate a function of the motor vehicle that is based on signals from the other sensor.

The driver may then be additionally informed of the functional impairment or functional deactivation by an optical and/or acoustic warning signal. This may for example be optionally combined with the request to seek out a mechanic. In this manner, the trust of a vehicle operator in the functioning of the vehicle-side monitoring system can be strengthened.

It has proven to be beneficial in some embodiments to use at least one sensor group for the method, in which at least three sensors are present that differ from each other in their measuring principle. For example, it is conceivable to use at least one ultrasound, one radar, and one image sensor (a camera) or at least one ultrasound, one image and, one lidar sensor in the sensor group. Other forms are also conceivable.

As mentioned at the outset and in another aspect, a motor vehicle is provided that is configured for performing the method for establishing a misalignment of at least one sensor according to the teaching herein.

Such a motor vehicle in some embodiments has at least one sensor group with two or more sensors in which at least two sensors differ from each other in their measuring principle. Further, the following are present in some embodiments:

A movement detection apparatus, further a surroundings representation apparatus, an object/sensor assignment apparatus, an object classification apparatus and an evaluation and control apparatus.

The movement detection apparatus serves to detect all movements that the motor vehicle makes between measuring points in time through which the position and orientation of the motor vehicle in relation to the detected objects in the surroundings is changed. It can work, for example, on the basis of the known vehicle odometry.

The data of all objects detected by the sensors in the surroundings of the motor vehicle can be stored or are stored in the surroundings representation apparatus. However, the storage of detected objects only takes place in a determined or determinable window of time and/or within a determined or determinable measurement space around the motor vehicle. A selected window of time may be, for example, up to several minutes; a selected measurement space can be, for example, up to several meters.

A relationship of each object to each sensor detecting this object can be stored or is stored in the object/sensor assignment apparatus.

Each object that is detected by one sensor but not by another sensor can be identified or is identified by the evaluation and control apparatus.

Each object detected by one or more of the sensors can be classified or is classified with regard to its detection-relevant properties (e.g. height, width, etc.) using the object classification apparatus.

An assessment of whether a specific object lies in the detection area of a specific sensor and whether a specific object must have been detectable by a specific sensor with a specific measuring principle simply due to its detection-relevant properties can be performed or is performed by the evaluation and control apparatus. A misalignment of a specific sensor can be determined here by the evaluation and control apparatus. In the event of a determined misalignment, at least one limitation of such a function of the motor vehicle that is based on signals from the sensor determined to be misaligned can be performed or is performed. Further, in the event of a limitation of a function resulting from misalignment, at least one optical and/or acoustic warning apparatus can be activated or is activated by the evaluation and control apparatus to output a warning message.

The motor vehicle may in some embodiments be configured so that the at least one sensor group comprises at least three sensors that differ from each other in their measuring principle. This means the sensor group can work particularly effectively with regard to redundancy.

In some embodiments, the motor vehicle may additionally have a sensor availability checking apparatus with which the availability of each sensor at the point in time at which a non-detected object was located in its detection area can be checked or is checked. This contributes to a possible development of the performed method.

After all, a driver may be optimally informed if a warning apparatus is present that can be controlled or is controlled by the evaluation and control apparatus such that an optical and/or acoustic warning message is output in the event of a limitation of function resulting from a misalignment.

Another exemplary embodiment of the present aspect is shown in the figures and is described in more detail in the following description with reference to the figures.

The same reference signs, even in different figures, refer to the same, comparable or functionally the same components. Corresponding or comparable properties and benefits are achieved here even if a repeated description or reference thereto does not occur. The figures are not, or at least not always, true to scale. In some figures, proportions or distances may be shown in an exaggerated manner in order to be able to emphasize features of an exemplary embodiment more clearly.

Figure 1:
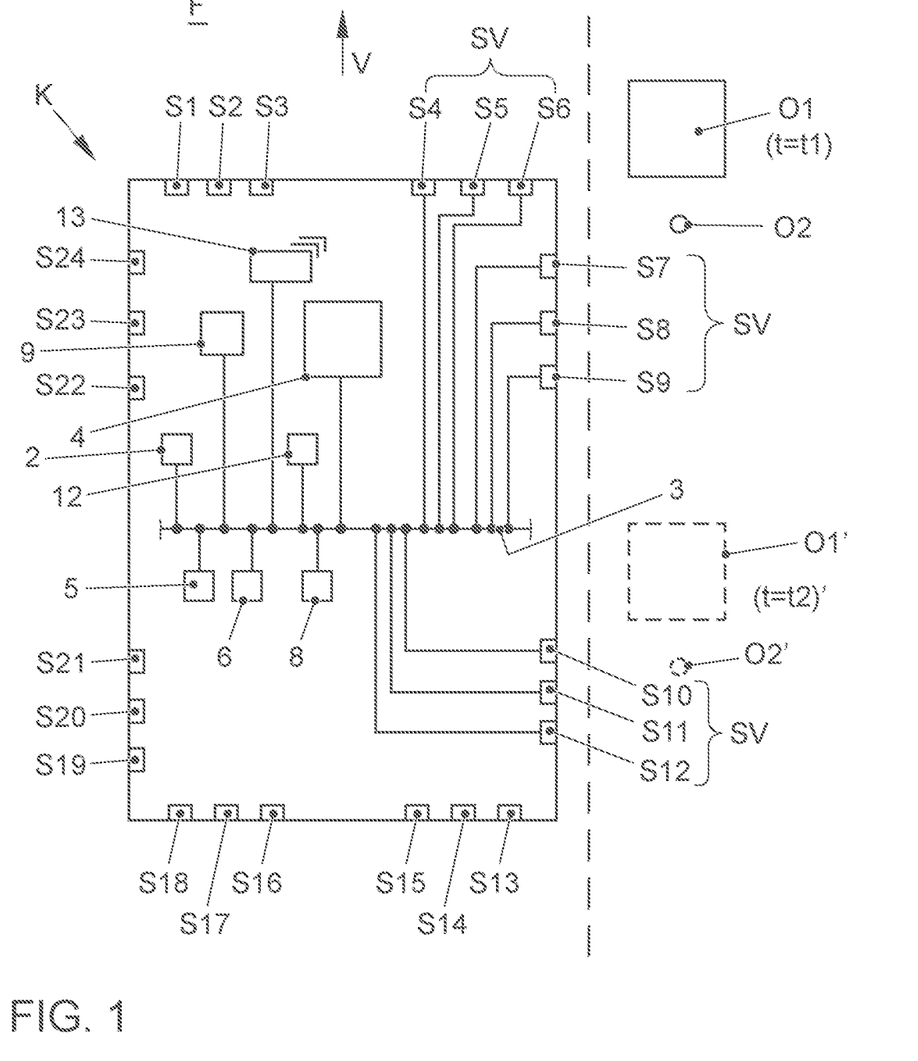
FIG. 1 shows a motor vehicle prepared for performing the method.

Reference is made first to FIG. 1. In this figure, a motor vehicle K can be seen which is configured for performing the method for establishing a misalignment of at least one sensor as discussed in the preceding according to the teachings herein.

The motor vehicle K is equipped with a plurality of sensors S1 to S24 that are suitable for detecting objects in the surroundings of the motor vehicle K. As an example, two objects O1 and O2 are shown which are located on the right edge of a roadway F, i.e. to the right side of the motor vehicle K.

Each three of the sensors S1 to S24 are logically combined to form a sensor group SV. Thus, in the exemplary embodiment, the sensors S1 to S3, S4 to S6, etc. up to the sensors S22 to S24 are in each case logically assigned to a sensor group SV. At least two of the sensors of each sensor group SV are based on measuring principles that are different from each other. In the exemplary embodiment, even all three sensors of a sensor group SV are based on measuring principles that are different from each other. For example, it is thus conceivable that a first sensor is an ultrasound sensor, a second sensor is an image sensor (camera) and a third sensor is a radar sensor. A sensor group may also have a lidar sensor, an ultrasound sensor and an image sensor. The enumeration is purely exemplary. Further, it is conceivable that the mix of the measuring principles for each of the sensor groups is chosen to be the same or also at least partially deviating from each other. Furthermore, the sensors of a sensor group may have an overlapping detection area. However, this is not a necessary requirement for the functioning of the method. One of the essential benefits of the method is that the sensors of a sensor group do not necessarily have to have an overlapping detection area.

Diverging from the exemplary embodiment, it is also conceivable that all sensors S1 to S24 of the motor vehicle K are logically assigned to only one single sensor group. The logical formation of other sensor groups is also conceivable, for example the formation of the sensor groups "rear of motor vehicle," "front of motor vehicle," "side of motor vehicle right" and "side of motor vehicle left."

All sensors S1 to S24 are connected to one data bus 3 (only shown for a part of the sensors) and via this are connected to other vehicle components for signaling purposes.

A movement detection apparatus 2, an evaluation and control apparatus 4, a surroundings representation apparatus 5, an object/sensor assignment apparatus 6, a sensor availability checking apparatus 8, an object classification apparatus 9, a warning apparatus 12 for outputting optical and/or acoustic warning messages and multiple driver assistance systems 13, such as, for example, a parking assistance system, an emergency braking system, a lane keeping system, etc. are also connected to the data bus 3.

The motor vehicle K drives in the representation at a speed v over the roadway F. The objects O1 and O2 are located in the area of the right front fender of the motor vehicle K at a specific point in time (t=t1). At a later point in time (t=t2), the objects O1 and O2 are already located in the rear area of the motor vehicle K (see O1', O2'). The movement of the motor vehicle K between the points in time t1 and t2 is determined by the movement detection apparatus 2 on the basis of the vehicle odometry or by other suitable methods.

Figure 2:
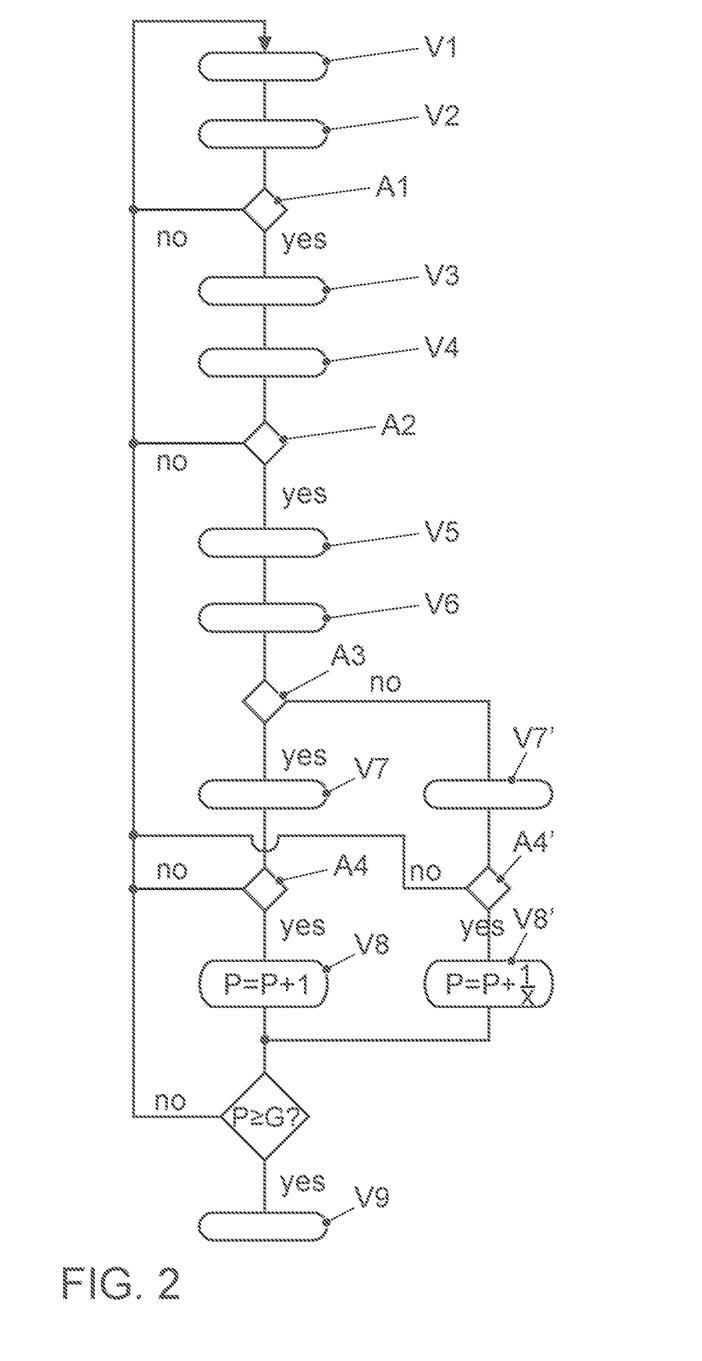
FIG. 2 shows a flow chart of the method.

With reference to FIG. 2, the process steps of an embodiment of the method for establishing a misalignment of at least one sensor will be explained in greater detail.

In a method step V1, all objects O detected by at least one of the sensors S1 to S24 (see also FIG. 4) are added by the surroundings representation apparatus 5 to a data set representing a surroundings of the motor vehicle. This data set is referred to as surroundings map U (see also FIG. 3) and may be stored in the surroundings representation apparatus 5.

In a method step V2, each detected object O is placed by the object/sensor assignment apparatus 6 in a relationship to each of the sensors S1 to S24 that detected the object O. These relationships are stored in an object/sensor assignment table Z of the object/sensor assignment apparatus 6 (see also FIG. 4). By means of a query A1, it is queried whether there are detected objects O in a sensor group SV that are detected by one sensor from the sensor group SV but not, however, by another sensor from the same sensor group SV. If yes, such objects O are identified in a method step V3.

Since it is assumed in the method that all sensors of a sensor group SV can normally detect a specific object O (for example, the sensors S4-S6 detect the object O1 and the sensors S7-S9 detect the object O2, see FIG. 1), it is assumed that the other sensor of a sensor group SV that has not detected an object is possibly misaligned. Therefore, a more intensive cause investigation is triggered for this sensor:

For this purpose, in a method step V4, the availability of the other sensor is checked by the sensor availability checking apparatus 8. In other words, it is checked whether the other sensor is even in principle (meaning functionally) available for the detection of an object. It may be the case that the other sensor is mechanically blocked (for example due to icing over or dirt). Here, for example, a self-check of the other sensor can be initiated. It is also conceivable that the other sensor is subject to an external source of interference (for example an electromagnetic radiation field) or that other sensor defects have led to a failure of the other sensor, which in turn can be checked by other check routines, such as, for example, checking for an external source of interference.

If a query A2 confirms that the other sensor was available, the object classification apparatus 9 classifies the object not detected by the other sensor in a method step V5 at least with regard to a part of its detection-relevant properties a, b, c, etc.

Figure 3:
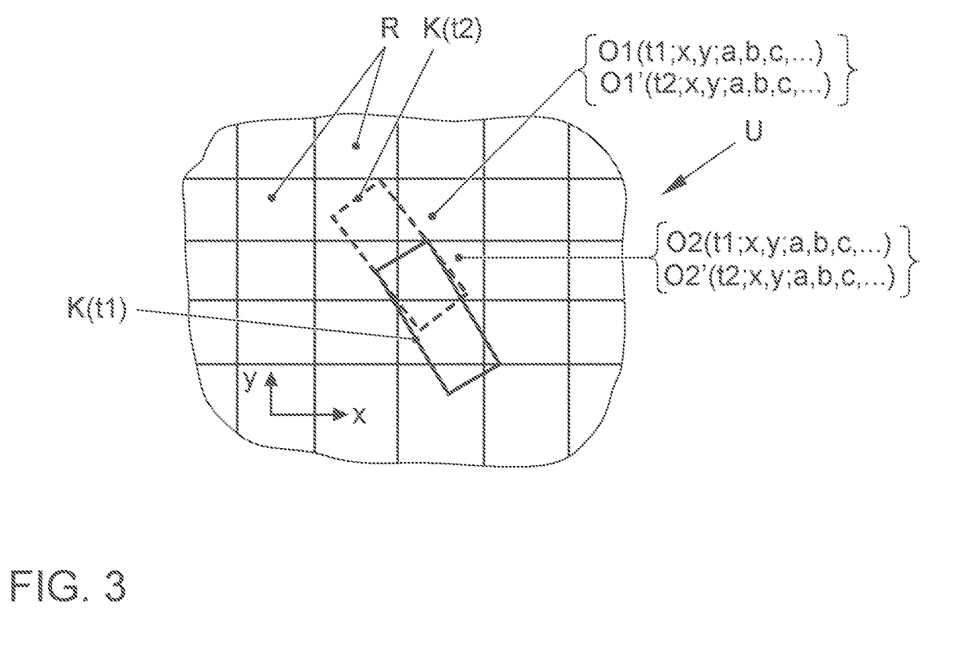
FIG. 3 shows a surroundings map.

Detection-relevant properties can be given, for example, by the height, width, shape, surface structure, color, the surface contour (e.g. rounded edges), the existence probability, the orientation and also the speed of an object and can already be accessed from the data pool of the mentioned surroundings map U (FIG. 3). The classification based thereon can be stored in a table of the object classification apparatus 9. It is conceivable, for example, to divide the objects with regard to the detection-relevant property "height" into the classes "smaller than 5 cm," "equal to 5 cm but smaller than 20 cm" and "higher than 20 cm." With regard to the detection-relevant property "shape," class divisions such as "angular, "round," "waved," for example, are conceivable. The property "surface structure" can, for example, be divided into the classes "rough," "smooth" or "inhomogeneous." For the property "color," the classes "dark" or "light," for example, are conceivable.

In a method step V6, it is also checked whether, for the non-detected object, all information for the assessment of a possible detectability by the other sensor that is relevant for the other sensor is available. In other words, it is checked here whether information about specific detection-relevant properties of the object that are of interest to the other sensor for the detection of objects due to its measuring principle are missing. Thus, for example, only the height of an object is detected although, for example, in addition to the height of an object, its color is also relevant for the other sensor for a faultless detection.

If a query A3 confirms that all information of the object not detected by the other sensor that is necessary and detection-relevant for the other sensor is present, it is checked in a method step V7 whether the non-detected object was in the detection area of the other sensor at a specific measuring point in time and must also have been detected by the other sensor taking into account the detection-relevant and classified properties.

These questions can be answered by the evaluation and control apparatus 4 on one hand using the surroundings map U (see FIG. 3) and on the other hand using the object classification that has been carried out.

The position coordinates x, y of each detected object relative to the motor vehicle K or respectively relative to the other sensor are also stored in the surroundings map U, wherein as mentioned the position and orientation changes of the objects in relation to the motor vehicle K caused by the movement of the motor vehicle are also taken into account. This is made clear by a position of the motor vehicle K shown within the surroundings map U at a first measuring point in time t1, see K(t1), and by a position of the motor vehicle K shown at a second measuring point in time, see K(t2).

On the other hand, the characteristic data of each of the sensors S1 to S24 are saved (including measuring principle, range, vertical and horizontal opening angle, position and orientation on the vehicle), for example in the evaluation and control apparatus 4. Due to the classification data stored in the object classification apparatus 9 as well as the detection-relevant properties from the surroundings map U, it can be answered for each object whether—when positioned in the detection area of the other sensor—it could also have been detected.

With this check, the detection-relevant and classified properties of the object are referenced to the specific measuring point in time at which the object lay in the detection area of the other sensor.

If a query A4 then determines that the object not detected by the other sensor was lying in the detection area of the other sensor and moreover could have been detected by it, the probability value P for a misalignment of the other sensor is increased. The determination of the misalignment therefore only takes place after a plurality of measuring points in time at which an incorrect measurement of the other sensor was determined.

In a method step V8, the probability value P is incrementally increased, starting from zero, over multiple measurements in which the result of the query A4 was positive. However, this value is also incrementally lowered if correct functioning (faultless object detection) of the sensor has been confirmed by another measurement (not shown in more detail).

A query A5 queries whether the probability value P is greater than or equal to a specific threshold value G. If this is the case, it is assumed that the other sensor is misaligned.

A misalignment of the other sensor is only determined here if the probability value P for a misalignment of the other sensor reaches or exceeds the threshold value G.

The determination of a misalignment of the other sensor results in a function based on signals from the other sensor being limited or deactivated in a method step V9. Further, the driver is informed by the warning apparatus 12 of the functional impairment by an optical and/or acoustic signal.

If however, a query A3 denies that all information about the object not detected by the other sensor that is detection-relevant for the other sensor is present, it branches to a method step V7' in which it is also checked whether the non-detected object lies in the detection area of the other sensor and moreover must have been detected by the other sensor.

In the event that this question is answered positively in a query A4', however, a detection uncertainty resulting from the incomplete information is additionally taken into account, since in the event of detection-relevant information of an object being missing from the other sensor, there is the possibility that the latter cannot sufficiently detect the object despite being aligned properly.

The detection uncertainty is therefore modeled in this case in that the already mentioned probability value P is incrementally increased in method step V8' over multiple measurements in which the result of the query A4' was positive by a smaller value (denominator N) than was the case in method step V8. However, the probability value P is also then in this case incrementally lowered if correct functioning (faultless object detection) of the sensor has been confirmed by another measurement (not shown in more detail).

The query A5 then queries whether the probability value P is greater than or equal to the mentioned threshold value G. If this is the case, it is assumed that the other sensor is misaligned.

With reference to FIG. 3, it is outlined what information can be modeled in the surroundings map U. The following attributes are now assigned to each detected object:

Point in time t of detection. In this manner, the surroundings map U can also model a history of the motor vehicle surroundings.

Coordinates x, y in relation to the motor vehicle. This way, the relative position to the motor vehicle K is thus detected.

Detection-relevant and classified object properties a, b, c, etc. (height, width, orientation, color, etc.)

In the section of the surroundings map U shown, it can be seen that this may have a pattern R formed by grid squares of equal size. Each grid square may, for example, have an edge length of 5 cm and logically models just such a surroundings area of the motor vehicle K. Detected objects are arranged in this pattern. Instead of structuring the surroundings map U based on a pattern, a vector-based structure, for example, is also conceivable (not shown).

In the section of the surroundings map U shown, the objects O1 and O2 that were detected at a point in time t1 are now visible. The same objects were detected a short time later (by other sensors) at a point in time t2.

Figure 4:
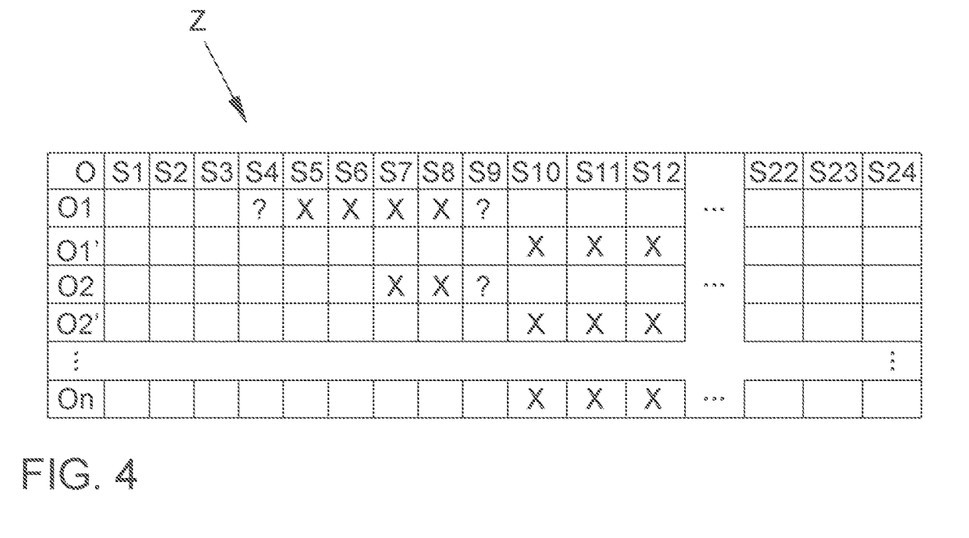
FIG. 4 shows an object/sensor assignment table.

Finally, it is shown with reference to FIG. 4 how each detected object O can be placed in a relationship to each of the sensors S1 to S24 that detected the object O.

The detecting sensors S1 to S24 of the motor vehicle K are thus arranged over detected objects O (O1 to On) in an object/sensor assignment table Z. The following information, for example, can be derived from the object/sensor assignment table Z (see also FIG. 1):

The object O1 was detected by the sensors S5, S6 of a sensor group SV, but not by sensor S4. Therefore, the sensor S4 requires another check according to the method (see question marks).

The object O1 was, however, also detected by the sensors S7 and S8 from another sensor group SV. The third sensor S9 of the other sensor group SV, however, did not detect the object O1. This also requires another check.

The object O2 was also not detected by the sensor S9 from the other sensor group SV, which means there is also a need for further checking here.

An object On (not visible in the section of the surroundings map U or in FIG. 1) was detected by all sensors S1 to S3 of a sensor group SV. Therefore, everything seems to be in order in this sensor group. Further checking therefore does not occur.

The described method provides in total a very secure check of whether a specific sensor is misaligned, since causes of a non-detection of a specific object can be checked from a wide variety of perspectives. This allows erroneous decisions, on the basis of which functions based on one sensor are limited or deactivated, to be kept to a minimum.

REFERENCE NUMBER LIST

2 Movement detection apparatus
3 Data bus
4 Evaluation and control apparatus
5 Surroundings representation apparatus
6 Object/sensor assignment apparatus
8 Sensor availability checking apparatus
9 Object classification apparatus
12 Warning apparatus
13 Driver assistance systems
a, b, c Detection-relevant object properties
A1-A4, A40, A41 Queries
F Roadway
K Motor vehicle
N Denominator
O Detected objects
O1-On Detected objects
O1', O2' Detected objects
R Pattern
S1-S24 Sensors for object detection
SV Sensor group
t; t1-t4 Points in time of a detection
U Surroundings map
v Speed
V1-V9, V7', V8' Method steps
x x coordinates
y y coordinates
Z Object/sensor assignment table The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for establishing the presence of a misalignment of at least one sensor within a sensor group of two or more sensors for detecting a plurality of objects in the surroundings of a motor vehicle, wherein at least two of the sensors of the sensor group differ from each other in their measuring principle and the measurement signals from the two or more sensors are compared with each other, comprising:

arranging the plurality of objects detected by the sensors in a surroundings map representing the surroundings of the motor vehicle;

determining at least one inconsistent object in the surroundings map that was detected within a detection period by a first sensor of the sensor group but not by a second sensor of the sensor group;

determining whether information for the assessment of detectability of the inconsistent object by the second sensor is available;

if it is determined that the information for the assessment of detectability of the inconsistent object by the second sensor is available, determining whether the inconsistent object was located in a detection area of the second sensor within the detection period; and in case the inconsistent object was located in the detection area of the second sensor within the detection period, determining a misalignment of the second sensor and otherwise, determining that no misalignment of the second sensor is present.

2. The method according to claim 1, wherein a misalignment of the second sensor is determined when a probability value for the presence of a misalignment of the second sensor reaches or exceeds a threshold value G.

3. The method of claim 2, wherein characteristic data of the two or more sensors of the sensor group are taken into account.

4. The method of claim 2, wherein the surroundings map representing the surroundings of the motor vehicle is formed in that, for each detected object, its locational relationship relative to the motor vehicle is referenced to a point in time of its detection and its detection-relevant properties are detected and saved, wherein a movement of the motor vehicle is also modeled in the surroundings map representing the surroundings of the motor vehicle.

5. The method of claim 2, comprising performing a classification of each detected object with regard to its detection-relevant properties.

6. The method of claim 1, wherein characteristic data of the two or more sensors of the sensor group are taken into account.

7. The method of claim 6, wherein the surroundings map representing the surroundings of the motor vehicle is formed in that, for each detected object, its locational relationship relative to the motor vehicle is referenced to a point in time of its detection and its detection-relevant properties are detected and saved, wherein a movement of the motor vehicle is also modeled in the surroundings map representing the surroundings of the motor vehicle.

8. The method of claim 1, wherein the surroundings map representing the surroundings of the motor vehicle is formed in that, for each detected object, its locational relationship relative to the motor vehicle is referenced to a point in time of its detection and its detection-relevant properties are detected and saved, wherein a movement of the motor vehicle is also modeled in the surroundings map representing the surroundings of the motor vehicle.

9. The method according to claim 1, wherein, when not all information for assessing the detectability by the second sensor are present, it is determined whether the inconsistent object lay in the detection area of the second sensor within the detection period and must have been detectable by the second sensor, wherein a detection uncertainty resulting from incomplete information is additionally taken into account.

10. The method of claim 1, comprising performing a classification of each detected object with regard to detection-relevant properties.

11. The method of claim 1, wherein it is additionally determined in an availability check whether the second sensor was defective, blocked, and/or subjected to an external source of interference at the point in time at which the inconsistent object was located in its detection area or other environmental influences prevented a detection of the inconsistent object by the second sensor.

12. The method of claim 1, wherein, when a misalignment of the second sensor is determined, a function of the motor vehicle based on signals of the second sensor is limited or deactivated.

13. The method according to claim 12, wherein the driver is informed of the functional impairment or functional deactivation by an optical and/or acoustic warning signal.

14. A motor vehicle comprising at least one sensor group of two or more sensors in which sensor group at least two sensors differ from each other in their measuring principle, and comprising:
   a movement detection apparatus;
   a surroundings representation apparatus;
   an object/sensor assignment apparatus;
   an object classification apparatus; and
   an evaluation and control apparatus; wherein
   the surroundings representation apparatus is configured to store data of one or more objects detected by the sensors of the sensor group in the surroundings of the motor vehicle; wherein
   the object/sensor assignment apparatus is configured to store a relationship of a first of the one or more objects to each sensor detecting the first object; wherein
   the movement detection apparatus is configured to establish movement of the motor vehicle within a specific time period; wherein
   the evaluation and control apparatus is configured to identify an inconsistent object that is detected by a first sensor but not by a second sensor; wherein
   the object classification apparatus is configured to classify each object detected with regard to its detection-relevant properties; wherein
   the object classification apparatus is configured to perform an assessment of whether a specific object lies in a detection area of a specific sensor and whether a specific object must have been detectable by a specific sensor; and wherein
   the evaluation and control apparatus is configured to determine a misalignment of a specific sensor and to establish at least one limitation of a function of the motor vehicle that is based on signals from the sensor determined to be misaligned.

15. The motor vehicle according to claim 14, wherein a sensor availability checking apparatus is provided and configured to determine availability of each sensor at the point in time at which an inconsistent object was located in its detection area.

16. The motor vehicle of claim 14, wherein a warning apparatus is present and configured to be controlled by the evaluation and control apparatus such that one or more of an optical and acoustic warning message is output in the event of a limitation of function due to a misalignment.

* * * * *